(No Model.)
F. RHIND.
COUPLING.
No. 604,790. Patented May 31, 1898.
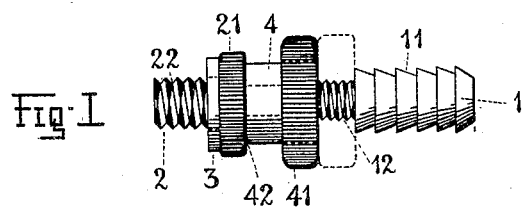
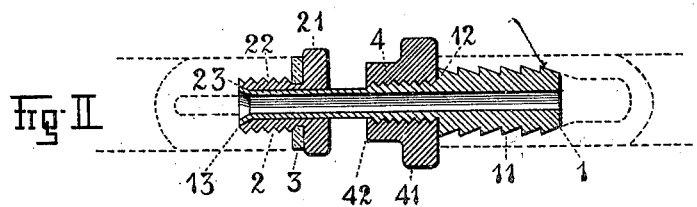
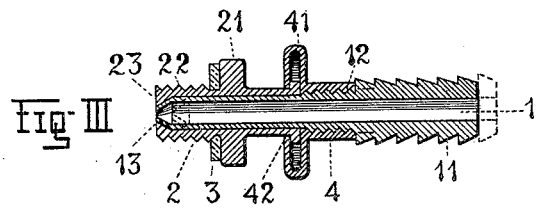
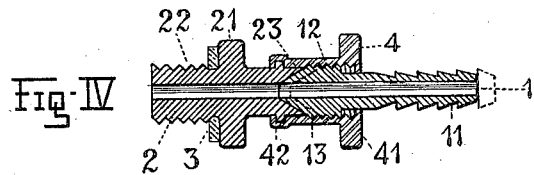
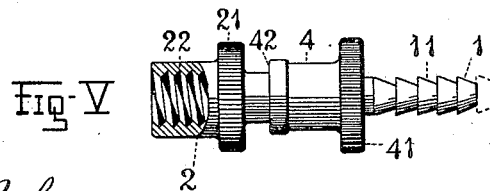
WITNESSES:
INVENTOR
BY
ATTORNEY.

UNITED STATES PATENT OFFICE.

FRANK RHIND, OF BRIDGEPORT, CONNECTICUT, ASSIGNOR OF ONE-HALF TO THE BRIDGEPORT BRASS COMPANY, OF SAME PLACE.

COUPLING.

SPECIFICATION forming part of Letters Patent No. 604,790, dated May 31, 1898.

Application filed December 13, 1897. Serial No. 661,617. (No model.)

*To all whom it may concern:*

Be it known that I, FRANK RHIND, a citizen of the United States, residing at Bridgeport, Connecticut, have invented a new and useful Improvement in Couplings, of which the following is a specification.

My invention relates to that class of couplings which is used to detachably connect a source of air or gas pressure with a receiver— *e. g.*, an air-pump with a cycle-tire. It is intended to obviate the necessity of a separate intermediate connecting-piece.

In the accompanying drawings, Figure I is an elevation; Fig. II, a longitudinal section of a coupling embodying my invention; Figs. III and IV, also in section, and Fig. V, in elevation, show modifications.

1 designates a tube provided with serrations 11, thread 12, and mouth 13; 2, a nipple formed with head 21, thread 22, and seat 23; 3, a washer; 4, a nut formed with head 41 and bearing-surface 42.

In the example of my invention shown in Figs. I and II of the drawings the tube 1 is serrated at 11 to engage with a rubber or other resilient connecting-tube. (Shown in dotted lines, Fig. II.) On its median threaded portion 12 runs a nut 4, the function of which will hereinafter appear. On the smooth end of the tube 1 is the nipple 2, adapted to limited longitudinal and to rotary motion thereon. The nipple 2 has a preferably knurled head 21, an external thread 22, adapted to engage with the internal screw-thread on the receiver, as the tire-nipple on a cycle-tire, (shown in dotted lines, Fig. II,) and a seat shown as a tapered end adapted to receive and to snugly fit the flaring mouth 13 of the tube 1. A washer 3 acts to prevent escape of air at the end of the tire-nipple or part to which connection is made. The nut 4 is adapted to bear against the head 21 of the nipple 2.

The operation of my device will be readily understood from an inspection of the drawings. The nipple 2, which turns freely on the tube 1, is first screwed into the tire-nipple or the like, as shown in Fig. II. The nut 4 is then screwed home, so that its surface 42 bears against the head 21 of the nut 2, as shown in Fig. I, thereby drawing the mouth 13 of the tube 1 into the seat 23 and making an air-tight joint. By reversing these operations the device is as easily uncoupled from the receiver.

In Fig. III I have shown in its operative position a modification of my device in which the mouth 13 of the tube 1 is contracted instead of flared, the seat 23 of the nipple 2 being correspondingly formed and the nut 4 being arranged to draw the nipple 2 so as to seat the parts 13 and 23. It is obvious that the operation of the device is not altered by this reversal of parts.

Fig. IV shows the seat 23 at the inner end of the nipple 2, the nut 4 acting as in Fig. III to draw the tube 1 and nipple 2 together and to render air-tight the seating of the mouth 13 in the seat 23. It is clear that, as before, the nipple is free as to rotation in relation to the tube, so that it may readily be inserted into a tire-nipple, the joint being afterward made tight by the nut.

In Fig. V of the drawings the form of construction is similar to that shown in Fig. IV, except that the nipple 2 is internally threaded at 22 to engage with an externally-threaded nipple on the receiver.

As now ordinarily constructed, cycle tires and pumps are not fitted to each other, but each to a separate nipple, which is easily lost. In my device this is dispensed with, the labor of coupling the pump to the tire being at the same time lessened.

I am aware that bicycle-pumps have long been made with a coupling consisting of a tubular body and a threaded nut or nipple free as to rotation and limited as to longitudinal motion thereon, the body extending through the nipple and the nipple being adapted to screw onto a receiver or the like. I do not of course claim as of my invention any such tube and nipple except in combination with a nut acting to force or hold such parts in a seated position, so as to make a substantially air or gas tight joint.

I am also aware that many mechanical alterations may be made in my device without departing from my invention.

What I claim is—

1. In a coupling in combination a tube having a tapered seating end, a nipple also having a tapered seating end adapted to engage with the end of said tube said nipple being free as to rotation and limited as to longitudinal motion in relation to said tube, a thread on said tube and a nut on said thread adapted to hold said parts in their seated position, substantially as described.

2. In a coupling in combination a tube provided with means for engaging a flexible pipe and flared at its free end, a nipple on said tube and tapered to receive the flared end thereof, a thread on said tube intermediate of its length and a nut on said thread adapted to bear against said nipple and to force said flared tube and said tapered nipple portion into engagement, substantially as described.

FRANK RHIND.

Witnesses:
 GEO. L. COOPER,
 LEWIS M. SEGEE.